No. 609,644. Patented Aug. 23, 1898.
A. A. WEST.
WEIGHING SCOOP.
(Application filed Dec. 21, 1897.)
(No Model.)
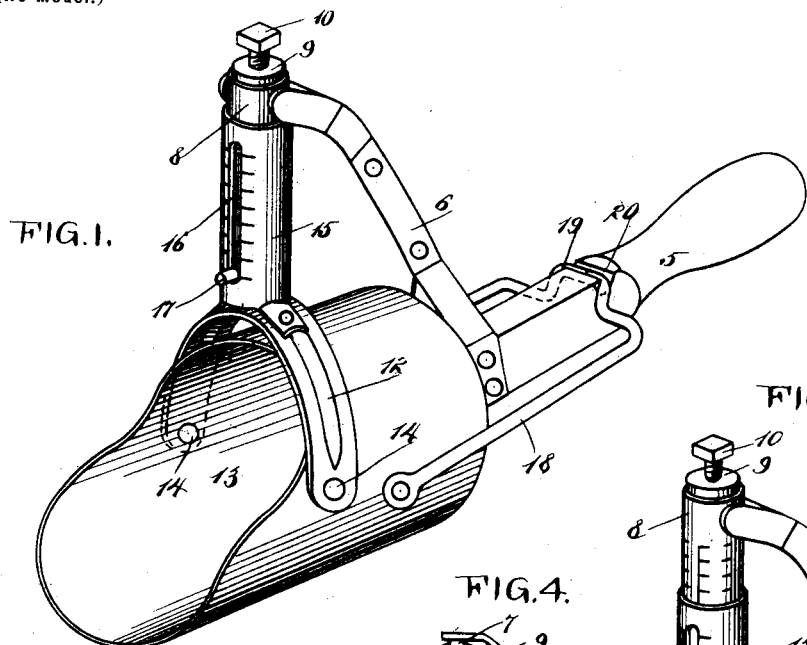
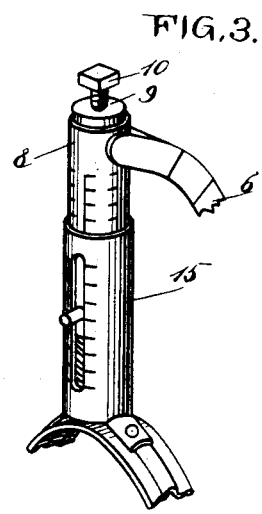
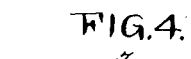
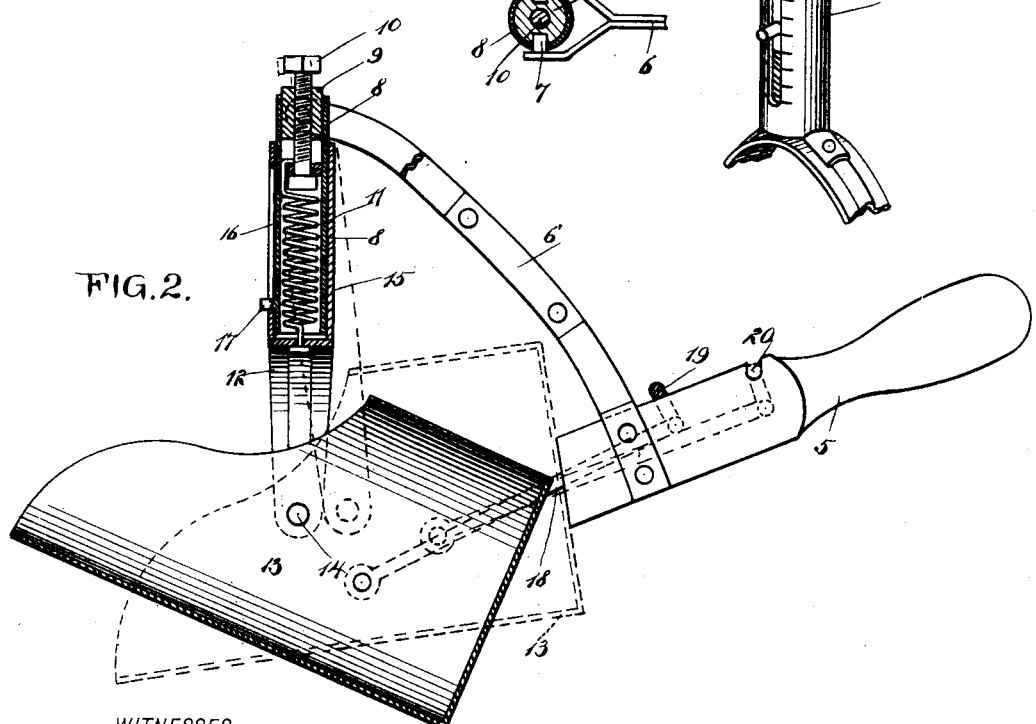
WITNESSES:
INVENTOR
A. A. West
BY
ATTORNEYS.

UNITED STATES PATENT OFFICE.

AUGUSTUS A. WEST, OF GILMAN, ILLINOIS.

WEIGHING-SCOOP.

SPECIFICATION forming part of Letters Patent No. 609,644, dated August 23, 1898.

Application filed December 21, 1897. Serial No. 662,873. (No model.)

*To all whom it may concern:*

Be it known that I, AUGUSTUS A. WEST, of Gilman, in the county of Iroquois and State of Illinois, have invented a new and Improved Weighing-Scoop, of which the following is a full, clear, and exact description.

This invention is a weighing-scoop by which merchandise may be taken from the place of storage and weighed by the same instrument, so that from such instrument the merchandise may be placed directly into a smaller receptacle for transportation; and the invention comprises a handle on which an arm stands, the arm having connection with the body of the scoop through the medium of a weighing-spring and the body of the scoop having a lock by which the weighing-spring may be rendered operative or inoperative.

This specification is the disclosure of one form of my invention, while the claims define the actual scope of the invention.

Reference is to be had to the accompanying drawings, forming a part of this specification, in which similar characters of reference indicate corresponding parts in all the views.

Figure 1 is a perspective view of the invention. Fig. 2 is a vertical section thereof. Fig. 3 is a fragmentary perspective of the scale extended, and Fig. 4 is a detail section taken through the head of the scale.

The handle 5 of the scale has an overhanging arm 6 standing thereon. The lower end of the arm 6 is bifurcated and secured to the handle, and the upper end of the arm is bifurcated also and carries two pins 7, which pass transversely through the upper portion of a tube 8 and into a block 9, fast in said tube. (See Fig. 4.) By these means the tube 8 is pivotally connected with the upper end of the arm 6. Working through the block 9 is a screw 10, the lower end of which is connected to a retractile spiral spring 11. This spring extends down through the tube 8 and is attached at its lower end to a yoke 12, which in turn spans the body portion 13 of the scoop and is pivotally secured thereto by means of trunnions 14, attached to the scoop. Rigidly attached to and forming a part of the yoke 12 is an exterior tube or casing 15, provided at its front portion with a vertically-extending slot 16, through which passes an indicating-pin 17, carried on the tube 8. Pivotally attached to and spanning the rear portion of the body 13 of the scoop is a U-shaped lock-bar 18, the middle portion of which is provided with a loop or offset 19, adapted normally to be held in a recess 20, formed in the handle 5.

The screw 10 serves to regulate the tension of the spring 11, and consequently to properly adjust the weighing device. The tube 15 is provided with graduations running along the slot 16, which graduations are read in connection with the movements of the pin 17 to indicate the weight of the material within the body portion 13. The tube 8 is also provided with graduations, as shown in Fig. 3, which being arranged in one central row and in two additional rows, one on each side of the central row, adapt the weighing apparatus to both right and left hand workers. The graduations may be arranged in any convenient manner on the tubes 8 and 15. When it is desired to use the invention, the lock-bar 18 is seated in the recess 20, so as to hold the body 13 in rigid connection with the handle 5, as shown in Fig. 1 and by dotted lines in Fig. 2. The scoop may now be manipulated as an ordinary scoop and the body portion thereof filled with material. Then if it be desired to weigh this material the lock-bar 18 may be disengaged from the recess 20, whereupon the body portion 13, with the attached weighing device, will swing into the position shown by full lines in Fig. 2. This will leave the body portion without support, and the weight of the material therein may be known by the indications on the tubes 8 and 15.

It will therefore be seen that my invention embodies a scoop which may be at all times used with the same facility that an ordinary scoop may be used and which by a simple movement of the thumb of the operator may be transformed into a weighing device, thus enabling the material handled to be weighed without necessitating placing it in a separate receptacle and handling the material twice in consequence thereof.

Having thus described my invention, I claim as new and desire to secure by Letters Patent—

1. The combination of a handle, an arm standing thereon, a tube pivoted to the arm, a block held in the upper portion of the tube, a screw adjustable in said block, a spring attached to the screw, a yoke to which the spring is also attached, a tube attached to the yoke and slidably receiving the first-named tube, a scoop-body pivotally mounted in the yoke, and a lock-bar pivoted to the scoop-body and capable of engaging with the handle.

2. The combination of a handle, an arm standing thereon, a tube mounted to swing from the arm, a spring connected with the tube, a yoke to which the spring is also connected, a tube fixed to the yoke and slidably receiving the first-named tube, a scoop-body to which the yoke is pivoted, and a lock-bar pivoted to the body portion and engaging the handle.

3. The combination of a handle having a notch, a body portion, a weighing device supporting the body portion on the handle, and a U-shaped lock-bar, the ends of which are pivoted to the body portion and the intermediate portion of which is provided with an offset capable of removably seating in a recess in the handle.

4. The combination of a handle, an arm standing thereon, a tube hung from the arm, a screw supported on the upper portion of the tube, a spring attached to the screw and adjusted thereby, a yoke to which the spring is also connected, a tube attached rigidly to the yoke and slidably receiving the first-named tube, a scoop body portion pivotally connected with the yoke, and a lock-bar capable of removably holding the body portion in rigid connection with the handle.

5. The combination of a handle, an arm standing thereon, a tube hung from the arm, a screw held adjustable in the upper portion of the tube, a spring attached to the screw, a yoke to which the spring is also connected, a tube rigidly attached to the yoke and slidably receiving the first-named tube, and a scoop body portion to which the yoke is connected.

6. The combination of a handle, an arm standing thereon, a weighing device suspended from the arm, a scoop carried by the weighing device, and a lock-bar pivoted to the scoop and capable of removable engagement with the handle to hold the scoop firmly engaged with the handle or to permit the free movement of the scoop.

7. The combination of a handle, an arm standing thereon, a weighing device hung from the arm, a scoop carried by the weighing device, and a U-shaped lock-bar straddling the scoop and pivoted thereto and engaging the handle at the intermediate portion of the lock-bar, the lock-bar being capable of removably holding the scoop rigidly with the handle.

AUGUSTUS A. WEST.

Witnesses:
  OTTO HEISE,
  A. E. MERRITT.